United States Patent [19]

Lair et al.

[11] Patent Number: 5,228,470
[45] Date of Patent: Jul. 20, 1993

[54] SELF DRAINING HOSE CONNECTION DUAL CHECK VALVE BACK FLOW PREVENTER

[75] Inventors: John E. Lair; James F. Delahunty; Lawrence F. Luckenbill; Richard J. Holliday, all of Decatur, Ill.

[73] Assignee: A.W. Cash Valve Manufacturing Corporation, Decatur, Ill.

[21] Appl. No.: 823,875

[22] Filed: Jan. 22, 1992

[51] Int. Cl.⁵ .................................. F16K 24/00
[52] U.S. Cl. .................................. 137/218; 137/798
[58] Field of Search ............... 137/215, 216, 217, 218, 137/798

[56] References Cited

U.S. PATENT DOCUMENTS

| 3,155,107 | 11/1964 | Woodford ..................... 137/218 |
| 3,905,382 | 9/1975 | Waterston . |
| 4,080,981 | 3/1978 | Stewart . |
| 4,646,775 | 3/1987 | Traylor . |
| 4,658,852 | 4/1987 | Weingarten . |
| 4,726,390 | 2/1988 | Franklin . |
| 4,821,763 | 4/1989 | Ackroyd et al. . |
| 4,893,644 | 6/1990 | Giacomini . |
| 4,909,270 | 3/1990 | Enterante, Sr. et al. . |
| 4,953,584 | 9/1990 | Vegso . |
| 4,976,279 | 12/1990 | King, Sr. et al. . |
| 4,984,306 | 1/1991 | Sumerix . |

Primary Examiner—John C. Fox
Attorney, Agent, or Firm—Wood, Phillips, VanSanten, Hoffman & Ertel

[57] ABSTRACT

In order to prevent contamination of a fluid source and to ensure drainage of a sill cock or the like, a detachable check valve back flow preventer for installation between a fluid inlet line and a fluid outlet line is provided. A housing with means for fastening the device to a fluid inlet line at one end of the housing and for connecting a fluid outlet line at the other end of the housing is provided. The housing has a central cavity within the housing. An inlet line drain valve is located within the housing between the central cavity and the fluid inlet line to provide for the drainage of fluid from the fluid inlet line to the fluid outlet line end of the housing when the fluid outlet line is not connected to the back flow preventer. A second valve is located within the housing between the central cavity and the fluid inlet line to control flow of fluids between the fluid inlet line and the central cavity. A third valve is located within the housing between the central cavity and the fluid outlet line to control flow between the central cavity and the fluid outlet line. In a second aspect of this invention a fourth valve is located within the housing between the central cavity and the drainage flow path to control flow between the central cavity and the venting means. This second aspect can be utilized in conjunction with the above three valves or in combination with only the second and the third valve.

28 Claims, 3 Drawing Sheets

SELF DRAINING HOSE CONNECTION DUAL CHECK VALVE BACK FLOW PREVENTER

BACKGROUND OF THE INVENTION

1. Technical Field

The present invention is generally directed to back flow preventers and, more particularly, to a device to attach to a sill cock or hydrant to prevent back flow of contaminants into the source of supply.

2. Background Art

When a liquid, such as water, is added to another liquid by means of a hose from a supply source to a delivery area, contamination of the supply source by the delivery area fluid can be a major problem. If the pressure from the delivery area is greater than the supply pressure, back flow will occur from the delivery area to the supply source. Contamination of the supply source will therefore result.

Where water or other uncontaminated supply liquids are used to clean and/or dilute toxic or otherwise dangerous liquids, the possibility of contaminating the liquid supply is a serious problem. This problem exists in industrial environments as well as in agricultural and residential applications when water is used to dilute chemicals or other fluids.

The concept of utilizing back flow preventers to control back flow is not new. Typically, a normally closed valve opens with flow into the inlet and closes when inlet flow ceases, at which time back pressure may occur.

When supply pressure is reduced and flow is stopped, liquid accumulates within the valve and in plumbing upstream from the valve. During cold weather, this trapped liquid may freeze, causing severe damage to the valve and upstream plumbing.

Draining features have been incorporated into check valves, such as A. W. Cash Valve Company Model VB-111, which has a stem extending from the outlet side of the valve which may be pushed to open the valve and allow drainage of the valve and upstream plumbing when a hose is not connected.

This type of manually drained valve relied on an operator to drain the valve, and this method of operation is not always reliable. Self-draining check valves are not new in the art and are shown in the following patent.

Lair U.S. Pat. No. 4,712,575, discloses a self-draining, single valve back flow preventer. When a hose is detached, a spool under spring pressure is permitted to move axially outwardly from the outlet end of the check valve. A valve, housed within the spool, thereby moves axially from its sealing washer, permitting flow and drainage. When the hose is connected, the spool and the valve housed within it are forced axially toward the sealing washer, creating a seal that prevents back flow. Atmosphere vent holes in the check valve housing prevent accumulation of back pressure within the valve. Sufficient water pressure during supply flow with the hose attached overcomes a small spring used to seat the valve and deflects the atmospheric vent sealing washer thereby sealing the atmospheric the vent holes.

If the Lair single check type valve becomes contaminated with foreign material, a particle of the contamination may lodge between the valve and the sealing washer, creating a passage through which back flow may occur.

Waterston U.S. Pat. No. 3,905,382, discloses a check valve with two normally closed spring biased valves, one inside the externally-threaded outlet, and the other located near the inlet. The central portion of the check valve has an externally-threaded vent outlet. When flow occurs, the force from the flow moves the inlet valve axially from its seat toward the outlet and seals the vent. The flow then progresses to the outlet valve where the flow pressure compresses the outlet spring and fluid flows from the check valve. When flow stops and back flow pressure is sufficient to overcome the valve in the outlet, liquid accumulates in the sealed tube and is discharged through the vent outlet.

Waterston does not provide for a draining feature to relieve accumulated liquid upstream from the check valve. The accumulation of liquid upstream from the check valve will result in severe damage to the check valve and plumbing upstream of the check valve in the event of freezing of the liquid. Also, Waterston does not provide for a draining feature for the internal portions of the check valve. Contamination may collect in the internal portion of the check valve when back flow conditions occur and, when normal flow resumes, the contamination trapped in the check valve will flow to the output destination. Further, the contamination within the check valve may cause internal damage through corrosion or severe damage may occur due to freezing if the valve is exposed to subfreezing temperatures.

The above check valves do not adequately assure the prevention of contamination from entering the supply source. If particulate matter is present in the contaminated output liquid, during back flow some of the particulate may become lodged between the valve and the valve seat of the back flow preventer. When this occurs, proper sealing is prevented and contamination may be permitted to enter the supply source.

Supply liquid and contaminates are frequently trapped in the inner workings of back flow preventers. The trapped liquids cause great harm to the back flow preventer when the liquids expand during freezing or if the liquids are corrosive liquids. Also, the trapped contamination can be released later into another delivery area.

Liquid is often trapped upstream of the back flow preventers when the outlet line to the check valve has been disconnected. The trapped liquid expands if frozen and may cause severe damage to the back flow preventer and the supply line.

The present invention is directed toward overcoming one or more of the problems discussed above.

SUMMARY OF THE INVENTION

In one aspect of the present invention, a dual check valve back flow preventer for installation between a fluid inlet line and a fluid outlet line that may or may not be attached to the back flow preventer is provided. A housing with means for fastening the device to a fluid inlet line at one end of the housing and for connecting a fluid outlet line at the other end of the housing is provided. The housing has a central cavity within the housing. An inlet line drain valve is located within the housing between the central cavity and the fluid inlet line to provide for the drainage of fluid from the fluid inlet line to the fluid outlet line end of the housing when the fluid outlet line is not connected to the back flow preventer. A second valve is located within the housing between the central cavity and the fluid inlet line to control flow of fluids between the fluid inlet line and the central cavity. A third valve is located within the housing between the central cavity and the fluid outlet line to control flow between the central cavity and the fluid outlet line.

In a preferred embodiment of this aspect of the invention a means for fastening the back flow preventer to the fluid inlet line is an internal fretted connector to mate with a residential sill cock and the means for connecting the back flow preventer to the fluid outlet line is an external threaded connector to mate with an ordinary garden hose.

In a highly preferred embodiment of this aspect of the invention the three valves of the back flow preventer have whole linear axis.

In a more preferred embodiment of this aspect of the invention the back flow preventer includes a means for terminally attaching the back flow preventer to the fluid inlet line.

In a second aspect of the present invention, a dual check valve back flow preventer for installation between a fluid inlet line and a fluid outlet line that may or may not be attached to the back flow preventer is provided. A housing including means for connecting the back flow preventer to the fluid inlet line at one end of the housing and for connecting the fluid outlet line to the other end of the housing and including means for venting the internal area of the housing to the atmosphere, is provided. The housing includes a central cavity. A drainage flow path between the central cavity and the venting means is provided. A central cavity drain valve is located within the housing between the central cavity and the drain flow path to control flow between the central cavity and the venting means. A second valve is located within the housing between the central cavity and the fluid inlet line to control flow between the fluid inlet line and a central cavity. A third valve is located within the housing between the central cavity and the fluid outlet line to control flow between the central cavity and the fluid outlet line. In a preferred embodiment of this aspect of the invention the back flow preventer includes means for fastening the back flow preventer to the fluid inlet line in an internal threaded connector to mate with a residential sill cock and a means for connecting the back flow preventer to the fluid outlet line is an external threaded connector to mate with an ordinary garden hose.

In a further preferred embodiment of this aspect of the invention the three valves of the back flow preventer have collinear axis.

In yet a more preferred embodiment of this aspect of the invention the back flow preventer includes means for permanently attaching the back flow preventer to the fluid inlet line.

In a third aspect of the present invention, a dual check valve back flow preventer for installation between a fluid inlet line and a detachable fluid outlet line is provided. A housing with means for fastening the device to a fluid inlet line at one end of the housing and for connecting a fluid outlet line at the other end of the housing is provided. The housing also includes means for venting an internal area of the housing to atmosphere. A central cavity within the housing is provided. A drainage flow path between the central cavity and the venting means is also provided. A first valve is located within the housing between the central cavity and the fluid inlet line to provide for drainage of fluids within the fluid line when the fluid outlet line is not connected thereto. A second valve is located within the housing between the central cavity and the fluid inlet line to control flow between the fluid inlet line and the central cavity. A third valve is located within the housing between the central cavity and the fluid outlet line to control flow between the central cavity and the fluid outlet line. A fourth valve is located within the housing between the central cavity and the drainage flow path to control flow between the central cavity and the venting means.

In a preferred embodiment of this aspect of the invention the means for fastening the back flow preventer to the fluid inlet line is an internal threaded connector to mate with the residential sill cock and the means for connecting the back flow preventer to the fluid outlet line is an externally threaded connector to mate with an ordinary garden hose.

In a still more preferred embodiment of this aspect of the invention, four valves within the back flow preventer have collinear axis. In yet another preferred embodiment of this aspect of the invention the back flow preventer includes means for permanently attaching the back flow preventer to the fluid inlet line.

In a fourth aspect of the present invention, the device has internal threads for fastening to a fluid supply line on one end of the housing and external threads for connecting a garden hose or other outlet line to the other end of the housing. A spool is slidingly fit within the housing so as to provide a drainage fluid flow path between the spool and the housing, and there is also a fluid flow path internal to the spool. A sealing means is located between the spool and the fluid inlet line of the housing for obstructing back flow when the hose is attached. In addition, the back flow preventer has an inlet valve mounted on the spool to control flow between the fluid inlet line and the spool internal flow path and an outlet valve mounted on the spool to control flow between the spool internal flow path and the fluid outlet line.

In still another aspect of the present invention, the back flow preventer has internal threads for fastening to a residential sill cock or other fluid inlet line at one end of the housing. The housing also has mating external threads for connecting a garden hose or other fluid outlet line to the other end thereof. Further, the housing has an axial bore on the external thread end and a large central cavity. A plurality of through holes communicating to atmosphere are located near the bottom of the housing. A spool with a stem end is slidably fit to a bore within the housing. The spool has an outside diameter smaller than the diameter of the central cavity of the housing. A drainage fluid flow path is provided between the spool and the housing which is in fluid communication with the through holes in the housing. The spool has a flow path which is internal to the spool. A separating means is provided to bias the spool toward a lower position. A seal is provided between the bore of the housing and the outer diameter of the stem of the spool. A seal is also located between the spool and the inlet line end of the housing for obstructing the drainage flow path when a garden hose or other outlet line is attached. An inlet valve is mounted on the spool to control flow between the inlet line and the spool internal flow path. A piston that protrudes through the outlet and is axially displaced upon the installation of the garden hose or other outlet line is mounted within the spool. An outlet valve is mounted on the piston to control flow between the spool internal flow path and the garden hose or other outlet line. A sealing means is provided at the bottom of the internal threaded area of the body. Also, a means to drain the central cavity is provided when the hose is attached and back flow occurs. Holes communicating to atmosphere are located in the body which provide drainage for the body.

In a preferred embodiment of this aspect of the invention, the housing is made from two pieces. The first piece of the housing is a cylindrical body and the second is a cylindrical adapter. The two pieces may have mating threads to be separable for disassembly of the components therein, or pressed or bounded together if disassembly is not preferred.

In a more preferred embodiment of this aspect of the invention, the inlet and outlet valves consist of pusher posts that slidably fit in bores on the spool and piston, respectively, and have seat discs which seal against a mating component and are biased in the sealed position by springs.

In a still more preferred embodiment of this aspect of the invention, a piston protruding from the outlet end of the housing is compressed into the housing when a garden hose or other outlet line is connected thereto. When compressed, the piston moves the spool in an upward direction, causing the spool to seat against the inlet end of the housing and form a seal to prevent drainage from the inlet.

It is an object of the present invention to provide a back flow preventer which will provide drainage of a fluid inlet line when a garden hose or fluid outlet line is not attached.

It is another object of the present invention to provide a back flow preventer which will drain an internal cavity of a housing when a hose or outlet line is not attached.

It is still another object of the present invention to provide a device that will not be rendered ineffective as a back flow preventer if a piece of particulate matter becomes lodged between either check valve and its valve seat.

It is another object of the present invention to prevent damage to the internal components of the device and inlet line between a shutoff valve and the device in the event of freezing of water within the valve or damage to the back flow preventer components if corrosive liquids are introduced therein from the outlet line.

It is yet another object of the present invention to provide a back flow preventer which is inexpensive to manufacture and maintain.

It is yet another object of the present invention to provide a back flow preventer that will operate in its respective modes automatically, without intervention

PREFERRED EMBODIMENT OF THE INVENTION

Figure 1:
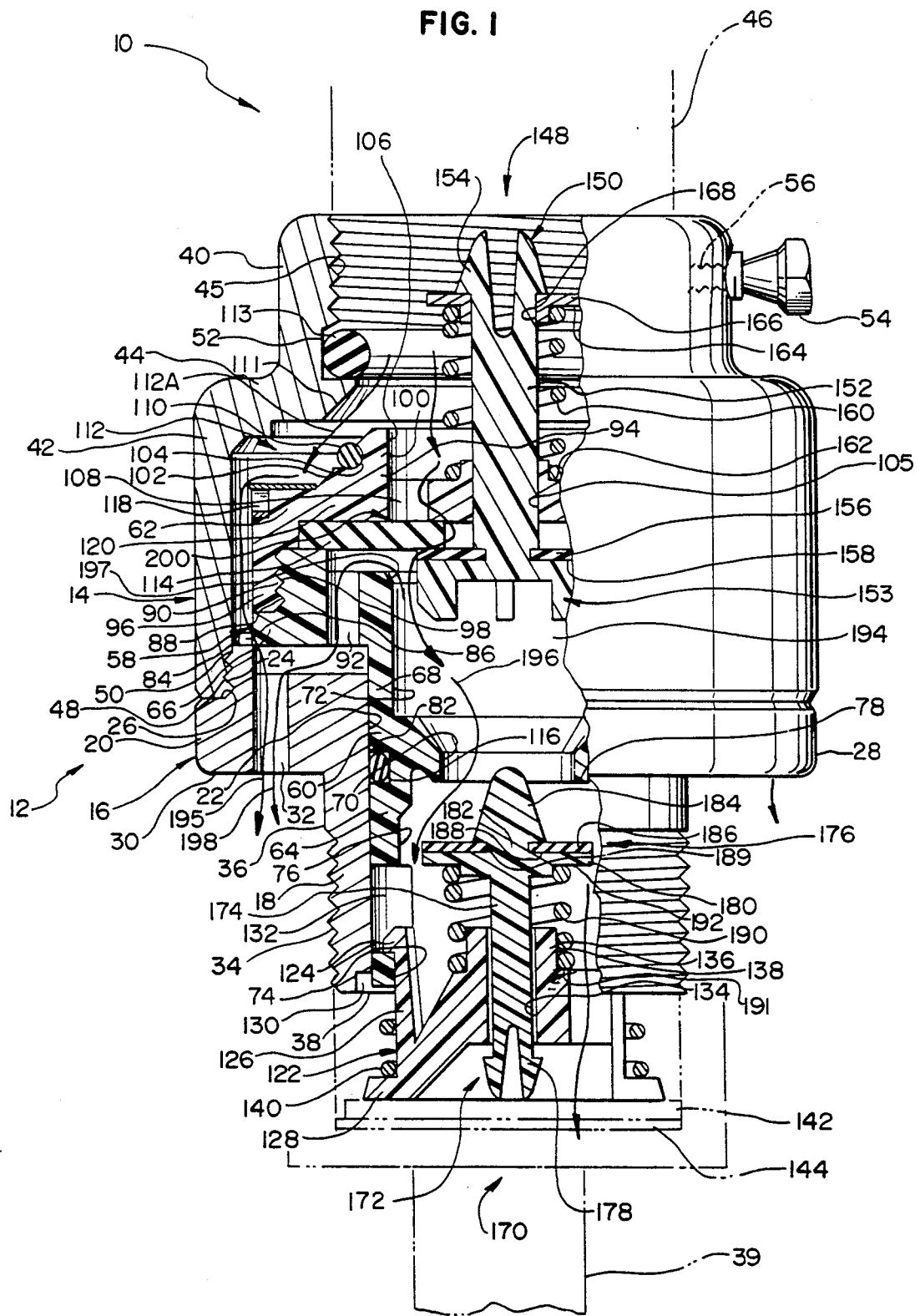
FIG. 1 is a partially broken cross-sectional view of a back flow preventer embodying the present invention without a hose connected in a no-supply-pressure, no-flow, self-draining condition.

An exemplary embodiment of a dual check valve back flow preventer 10 including the self-draining feature of the present invention is shown generally in FIG. 1.

The dual check valve back flow preventer 10 includes a cylindrical, tubular housing 12 constructed of a durable material, such as brass.

The housing 12 consists of two pieces, a cylindrical adapter 14 that is threadably connected to a body 16. The threads may be adhesive bonded to prevent disassembly and tampering with or removal of internal components.

The body 16 has a cylindrical shape, has a stem end 18, a flange end 20 and a centrally-located through bore 22. The flange end 20 has large external threads 24 located on the recessed outside diameter thereof, That extend to a shoulder 26. A large outside diameter 28 is located between the shoulder 26 and a stem end face 30 of the flange end 20 that adjoins the stem end 18. Axial drain holes 32 extend through the flange end 20 of the body 16 and provide a means for venting the housing 12. The stem end 18 of the body 16 has external threads 34 located at an outside diameter 36. The threads 34 extend as required from end 38 of the stem end 18 along the outside diameter 36.

In a preferred embodiment, the small external threads 34 are preferably of sufficient size and pitch to threadably fit a garden hose 39. Other thread styles of suitable size and pitch may be substituted to meet outlet line requirements.

The second piece of the housing 12 is the cylindrical adapter 14, which has a small tubular or cylindrical end 40, a large tubular or cylindrical end 42, and a central flange 44 connecting the ends 40 and 42. The small end 40 has internal threads 45 which may, for example, fit to a residential sill cock 46. The large end 42 has large internal threads 48 on a large inside diameter 50 of the large end 42. The large internal threads 48 of the adapter 14 matingly fit with and threadingly engage the large external threads 24 of the body 16. A sill cock O-ring or gasket seat area 52 that is located in the small end 40 of the adapter 14, extends from the end of the small internal threads 45 to the flange area 44. A Lock screw 54 is matingly fit to internal threads 56 radially located through the small end 40 of the adapter 14.

A spool 58 is slidingly positioned within the bore 22 of the body 16 of the housing 12. The spool assembly 58 is made of two pieces which are a body seat 60 and a bonnet 62. The body seat 60 has a stem end 64 and a flange end 66. The stem end 64 has a stem 68 of a diameter to slidingly fit within the bore 22 of the body 16. The body seat 60 has a centrally-located through bore 70, a large counter bore 72 on the flange end 66 thereof and a large counter bore 74. The body seat 60 also has a smaller counter bore 76 located between the large counter bore 74 and the centrally-located through bore 70. A valve seat 78 is located between the centrally-located through bore 70 and the small counter bore 76.

As will also be seen, the stem 68 has an O-ring groove 82.

The flange end 66 of the body seat 60 has a large outside diameter 84 that matingly fits within the large inside diameter 50 of the large tubular end 42 of the adapter 14. The large outside diameter 84 has several notches 86. The flange end 66 of the body seat 60 has large external threads 88 that extend at least partially along the smaller outside diameter 90 of the flange end 66 of the body seat 60. The flange end 66 of the body seat 60 has several axial passages 92 therethrough.

The other piece of the spool 58 is a cylindrical bonnet 62, comprised of a flange end 94 and a large tubular or cylindrical end 96. The end 96 has large internal threads 98 to mate with the large external threads 88 on the body seat 60. The flange end 94 has, on the end opposite the tubular end 96, a hub 100 with a tapered face 102. The tapered face 102 has an annular seal groove 104. The flange end 94 of the bonnet 62 has a centrally-located axial through bore 105 and a large counter bore 106 together with an axial passage 108 in the bottom of counter bore 106.

A bonnet O-ring 110 is located in the seal groove 104 so as to be able to seat against the O-ring seat area 111 of the adapter 14.

The bonnet 62 and the adapter 14 form a first valve 112 to seal a drain passageway 112A between the O-ring 110 and the O-ring seat area 111 of the adapter 14.

A sealing O-ring or gasket 113 is located between the small internal threads 45 of the small tubular or cylindrical end 40 and the central flange 44 of the adapter 14.

A bonnet seat disc 114 is located between the flange end 94 of the bonnet 62 and the outer end of the flange end 66 of the body seat 60.

A spool O-ring 116 is located in the O-ring groove 82 in the stem 68 of the body seat 60.

A spring 118 is located on a land 120 of the flange end 94 of the bonnet 62 which can seat against the internal face of flange 44 of the adapter 14 near the large tubular end 42.

A piston 122 slidingly fits within the large counter bore 74 of the stem end 64 of the body seat 60. The piston 122 has tabs 124 that extend from legs 126 and engage with pockets 132 located in the stem end 64 of the body seat 60. The piston 122 also has a flange 128 that can rest against a counter bore 130 of the stem end 64 of the body seat 60 and a centrally-located axial bore 134. As shown, the piston 122 has a centrally-located hub 136 with a pilot 138.

A piston spring 140 is located in the stem end 64 of the body seat 60 under an inside face of the flange 128 of the piston 122.

A sealing washer 142 is located between the end 38 of the stem end 64 of the body seat 60 and a washer seat 144 of the garden hose 39.

A second valve or inlet valve 148 is mounted in the bore 105 of the bonnet 62 of the spool 58. The inlet valve 148 includes an inlet pusher post 150 slidingly movable within the bore 105 of the bonnet 62. The inlet pusher post 150 has a stem 152 having a head 153 on one end thereof and on the other end of the stem 152 is a stop 154. The inlet pusher post 150 has an inlet seat disc 156 attached to an inner face 158 of the head 153 of the inlet pusher post 150. An inlet valve spring 160 is located between a recessed face 162 of the flange end 94 of the bonnet 62 and an inside face 164 of a retainer 166. The retainer 166 has a bore 168 by which it is matingly fit to the stem 152 of the inlet pusher post 150 to rest against the stop 154.

A third valve or outlet valve 170 is mounted through the bore 134 in the piston 122. The outlet valve 170 has an outlet valve pusher post 172 that slidably fits in the bore 134 of the piston 122. The pusher post 172 has a long stem 174 and head 176 is located on one end of the long stem 174 with a stop 178 being located on the other end thereof. The head 176 has a flange 180 which is attached to the long stem 174, a short stem 182 collinear with long stem 174 on the end of the flange 180 opposite the long stem 174, and a retainer 184 on the end of the short stem 182 opposite the flange 180. The outlet valve pusher post 172 has an outlet seat disc 186 supported by an outer face 188 of the head 176 of the outlet pusher post 172. The outlet seat disc 186 has a bore 189 which is matingly fit to the short stem 182 at the flange outer face 188 of the outlet pusher post 172. An outlet valve spring 190 is located between a shoulder 191 of the pilot 138 of the piston 122 and an inner flange face 192 of the outlet pusher post 172.

A large central cavity 194 is located within the housing 12 between the inlet valve 148 and the outlet valve 170.

The exemplary embodiment of the back flow preventer 10 described heretofore has five distinct operating modes.

The first of these modes, as illustrated in FIG. 1, describes the conditions in which a garden hose 39 or the outlet line is not attached to the back flow preventer 10 and no inlet pressure or inlet flow is occurring. Under these conditions, the spring 118, located between the adapter 14 and the bonnet 62, forces the spool 58 axially downward. This movement of the spool 58 causes a separation between the bonnet O-ring 110 and the adapter O-ring seat area 111 of the adapter 14. Liquid that may have accumulated in the sill cock 46 or inlet plumbing downstream of a shutoff valve drains through the opening between the bonnet O-ring 110 and the O-ring seat area 111. The liquid progresses through the clearance between the bonnet 62 and the adapter 14, then travels through the slots 86 in the large outside diameter 84 of the body seat 60, and leaves the back flow preventer 10 through the drain holes 32 located in the body 16.

Liquid that may be trapped in the large counter bore 72 of the body seat 60 escapes through the clearance between the valve seat 78 and the outlet seat disc 186. The liquid then travels through the opening in the piston 122 between the hub 136 and the legs 126 of the piston 122.

During installation, the internal threads 45 on the adapter 14 are screwed onto the external threads of the sill cock or inlet piping 46. The lock screw 54 is then rotated and seated against the external threads of the sill cock or inlet piping 46.

In the first mode of operation, residual or retained liquid is permitted to freely flow from the sill cock or inlet piping 46, through the back flow preventer 10 and out of the back flow preventer 10. Fluids that may have previously entered the internal portions of the back flow preventer 10 are also freely permitted to escape from the back flow preventer 10.

Figure 2:
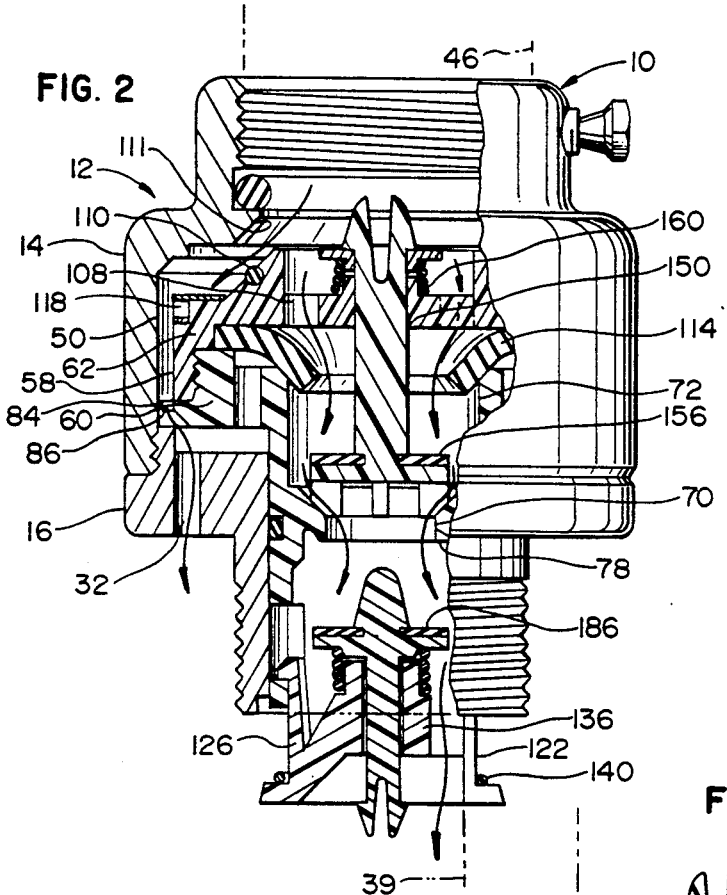
FIG. 2 is a partially broken cross-sectional view illustrating the present invention with the conditions of supply pressure and flow when a hose is not attached.

The second of the five operating modes of the exemplary embodiment of the back flow preventer 10 is illustrated in FIG. 2. In this operating mode, the garden hose 39 or other outlet line is not attached to the back flow preventer 10. However, liquid is flowing under pressure from the sill cock or inlet piping 46. In this mode, the spring 118 is used to axially displace the spool 58 in a downward direction away from the adapter 14. This movement causes the bonnet O-ring 110 to separate from the O-ring seat area 111 of the adapter 14. Liquid from the sill cock 46 or inlet piping flows in an external spool drainage fluid flow path 195 through the space between the bonnet O-ring 110 and the O-ring seat area 111 into the clearance between the outside diameter of the bonnet 62 and the inside diameter 50 of the adapter 14. The liquid then travels through the slots 86 in the large outside diameter 84 of the body seat 60. The liquid then leaves the back flow preventer 10 through the drain holes 32 in the body 16. Liquid also flows in a spool internal flow path 196 from the inlet 46 through axial passages 108 in the bonnet 62 to the bonnet seat disc 114. Liquid pressure upon the bonnet seat disc 114 forces the inner portion of the bonnet seat disc 114 downward against the inlet seat disc 156. The downward pressure on the inlet seat disc 156 then moves the inlet pusher post 150 downward, compressing the inlet valve spring 160. The liquid then flows between the space now available between the inlet seat disc 156 and the bonnet seat disc 114. The liquid then travels through the large counter bore 72 of the body seat 60 to the centrally-located through bore 70 of the body seat 60. The piston spring 140 forces the piston 122 axially downward in relation to the body seat 60. This relative motion causes the outlet seat disc 186 to become separated from the valve seat 78. The liquid then is permitted to travel through the centrally-located through bore 70 of the body seat 60, between the outlet pusher post valve seat 78 and the outlet disc seat 186, and finally through the passageways between the hub 136 and the legs 126 of the piston 122.

In the second mode of operation of the back flow preventer 10, the fluid is permitted to freely flow and flush both the outer passage between the spool 58 and the housing 12, as well as through the inner passage of the spool 58. Any contamination that may have accumulated is easily, simply, and thoroughly cleansed from within the back flow preventer 10.

Figure 3:
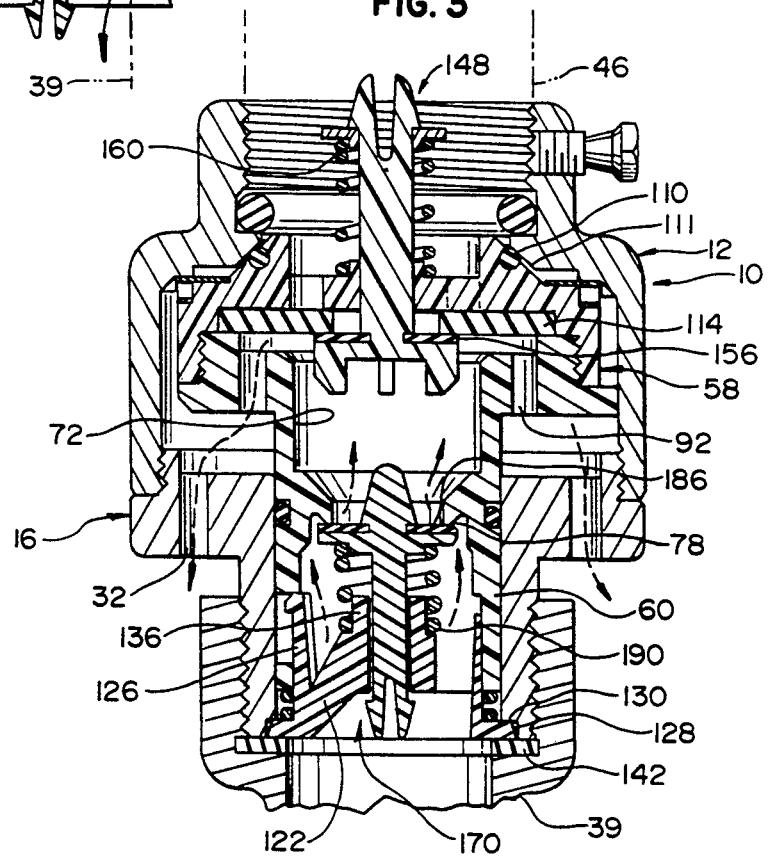
FIG. 3 is a cross-sectional view illustrating the present invention with an attachment and no supply pressure or flow, dashed flow indicators illustrate back flow into the device and out of the atmospheric vent holes, should the outlet check valve not seal.

The third mode of operation of the exemplary embodiment of the back flow preventer 10 is illustrated in FIG. 3. In this mode, the garden hose 39 or other outlet line will be understood as being attached to the back flow preventer 10. No supply pressure or flow is entering the back flow preventer 10 from the sill cock 46 or inlet line.

When a garden hose 39 is attached to the back flow preventer 10, the garden hose washer 142 contacts the flange 128 of the piston 122, moving the piston 122 axially upward. The flange 128 of the piston 122 then contacts the counter bore 130. The spool 58 is thereby moved axially upward relative to the housing 12. This relative motion causes the bonnet O-ring 110 to seat against the adapter O-ring seat area 111.

The axial movement of the piston 122 in an upward direction when installing the garden hose 39, causes the outlet valve 170 to move in an upward axial direction relative to the spool 58. The outlet spring 190 places upward pressure on the outlet valve 170, causing the outlet seat disc 186 to seat against the valve seat 78.

The inlet valve spring 160 places upward pressure on the inlet valve 148, causing the inlet seat disc 156 to seat against the bonnet seat disc 114.

Contaminated fluid from the garden hose 39 or other outlet line, if back pressure is present, enters the back flow preventer 10 through the axial passages between the hub 136 of the piston 122 and the legs 126 of the piston 122. Generally, the contamination is then stopped from further progress into the back flow preventer 10 by the sealing which occurs between the valve seat 78 and the outlet seat disc 186.

In the event that the contaminated fluid from the garden hose contains particulate matter that may have become trapped between the valve seat 78 and the outlet seat disc 186, a small amount of contaminated liquid may enter the large counter bore 72 of the body seat 60. Further progress of the contamination is prevented by the seal formed between the inlet seat disc 156 and the bonnet seat disc 114. The contamination then leaves the large counter bore 72 through the space between a body seat ring 197 and the bonnet seat disc 114, travels through the axial passages 92 and exits the back flow preventer 10 through the drain holes 32, a liquid central cavity flow path 198 being formed by this series of clearances and holes through which the fluid flows.

In this third mode of operation, back flow is prevented from entering the sill cock 46 by, first, the outlet valve 170 and, in the event of its failure, by the inlet valve 148, whereby the fluid discharges through passages 92 and 32. Contamination that may enter the center portion of the back flow preventer 10 is vented to atmosphere by the drain holes 32 and the axial passages 92.

Figure 4:
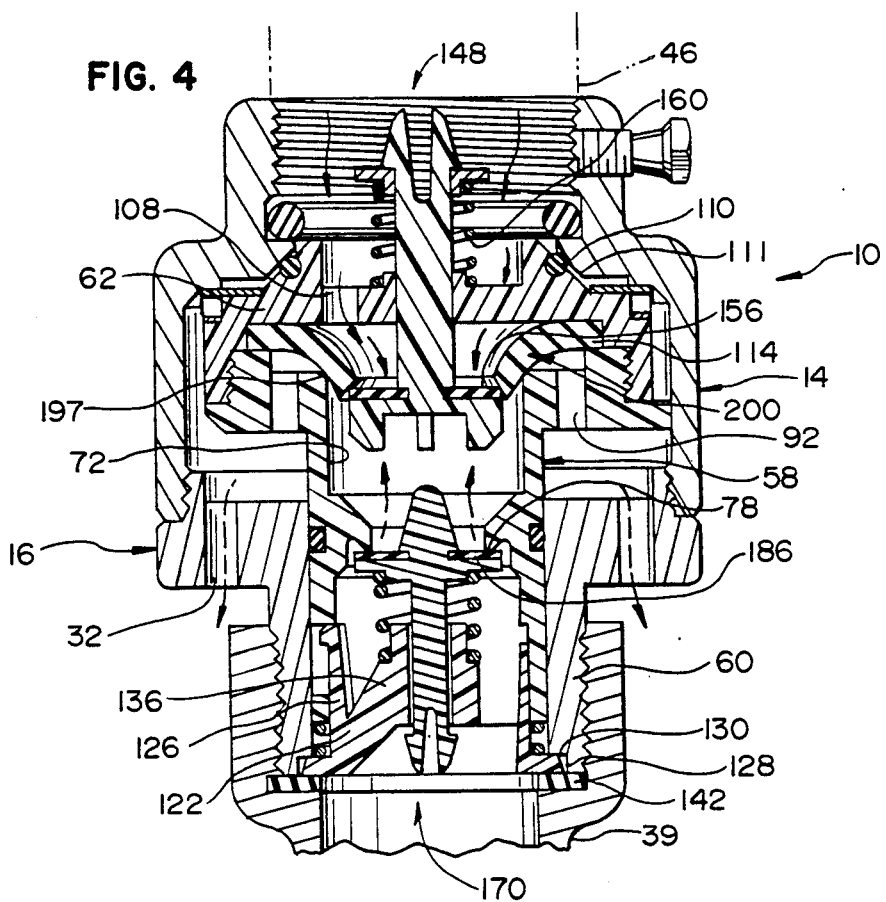
FIG. 4 is a cross-sectional view of the present invention showing a condition with an attachment, supply pressure, no flow.

The fourth mode of operation of the exemplary embodiment of a back flow preventer 10 is illustrated in FIG. 4. In this configuration, the garden hose 39 or other outlet lines is also attached to the back flow preventer 10. In this mode, pressure, but no flow is present. As the garden hose 39 is installed, the garden hose washer 142 pushes the flange 128 of the piston 122 in an axially upward direction relative to the spool 58 until the flange 128 of the piston 122 contacts the counter bore 130 of the body seat 60. The outlet valve 170 correspondingly moves axially upward with the piston 122 until the outlet seat disc 186 seats against the valve seat 78. As the piston 122 continues in its axially upward motion, the spool 58 moves in an axially upward direction. This axial upward motion of the spool 58 causes the bonnet O-ring 110 to seat against the adapter O-ring seat area 111 of the adapter 14.

The supply pressure at the inlet causes liquid which flows through the axial passages 108 in the bonnet 62 to downwardly flex the inner portion of the bonnet seat disc 114 which causes a downward motion of the inlet valve 148. Fluid supply pressure acting on bonnet seat disc 114 causes flexure of bonnet seat disc 114 against the seat ring 197, thereby sealing and preventing fluid flow through axial passages 92 and drain holes 32. A fourth valve 200 is formed by the flexing of the bonnet seat disc 114 against the seat ring 197 at the upper inside end of the large counter bore of the body seat 60 to block flow through the axial passages 92 of the body seat 60. Spring force applied to inlet seat disc 156 by compressed spring 160 seals inlet Seat disc 156 tightly against bonnet seat disc 114 until downward pressure overcomes the force of the inlet valve spring 160. The pressure required to move inlet seat disc 156 away from bonnet seat disc 114 exerts sufficient force across bonnet seat disc 114 to maintain sealing against the seat ring 197. Pressure at the inlet with no flow through the hose or other outlet line results in a static condition within the back flow preventer 10.

Contaminated fluid from the garden hose 39, if back pressure exceeds inlet pressure, enters the back flow preventer 10 through the axial passages between the hub 136 of the piston 122 and the legs 126 of the piston 122. Generally, the contamination is then stopped from further progress into the back flow preventer outlet 10 by the sealing that occurs between the valve seat 78 and the outlet seat disc 186.

In the event that the contaminated fluid from the garden hose 39 contains particulate matter that may have become trapped between the valve seat 78 and the outlet seat disc 186, a small amount of contaminated liquid may enter the large counter bore 72 of the body seat 60. Further progress of the contamination is prevented by the seal formed between the inlet seat disc 156 and the bonnet seat disc 114. As fluid back flow pressure approaches inlet pressure, bonnet seat disc 114 moves away from seat ring 197. The contamination then leaves the large counter bore 72 through the space between the body seat 60 and the bonnet seat disc 114. The contamination then travels through the axial passages 92 of the body seat 60, and exits the back flow preventer 10 through the drain holes 32 in the body 16.

In this fourth mode of operation, back flow is prevented from entering the sill cock 46 or other inlet line by, first, the outlet valve 170 and, in the event of its failure, by the atmospheric vent drain holes 32 and finally by inlet valve 148. Contamination that may enter the center portion of the back flow preventer 10 is vented to the atmosphere by the drain holes 32 and the axial passages 92.

Figure 5:
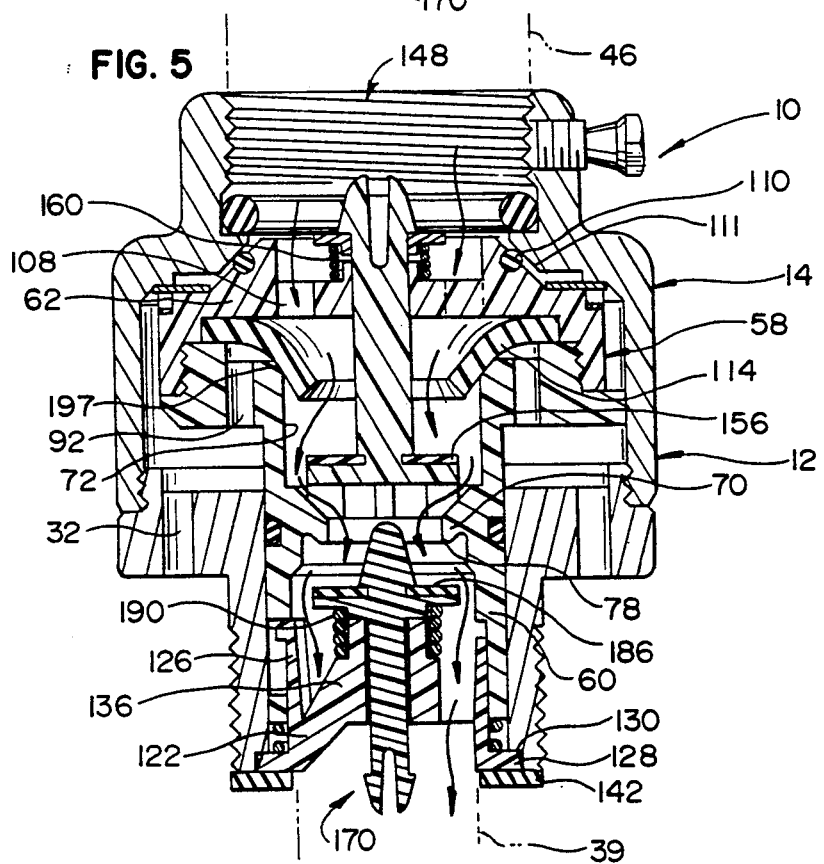
FIG. 5 is a cross-sectional view of the present invention illustrating the condition with the hose or outlet line attached, adequate supply pressure, and flow through the device and hose or outlet line.

The fifth mode of operation of the preferred exemplary embodiment of the back flow preventer 10 is illustrated in FIG. 5. In this mode of operation, the garden hose 39 is also attached to the back flow preventer 10. Liquid flow is occurring under pressure from the sill cock 46.

In this mode of operation, as the garden hose 39 or other outlet line is installed on the back flow preventer 10, the hose washer 142 contacts the flange 128 of the piston 122, moving the piston 122 in an axial upward direction relative to the housing 12 until the flange 128 contacts the counter bore 130 of the body seat 60. The outlet valve 170, located on the piston 122, moves in the axial upward direction with the piston 122 until the outlet seat disc 186 seats against the valve seat 78. The spool 58, which is a part of the body seat 60, moves in an axial upward direction. The axial upward motion of the spool 58 relative to the housing 12 causes the bonnet O-ring 110 to seat against the adapter O-ring seat area 111 of the adapter 14. The inlet valve spring 160 forces the inlet valve 148 in an upward direction, causing the inlet seat disc 156 to seat against the bonnet seat disc 114.

Liquid flow from the sill cock 46 enters the back flow preventer 10. Liquid flow is prevented from flowing between the spool 58 and the housing 12 by the seal caused by the bonnet O-ring 110 contacting the adapter O-ring seat area 111. Fluid entering the sill cock 46 passes through the axial passages 108 in the bonnet 62 and contacts the bonnet seat disc 114. The pressure from the fluid flow flexes the inner portion of the bonnet seat disc 114 downwardly, causing a seal with seat ring 197. This downward motion causes the inlet seat disc 156 which is in contact with the bonnet seat disc 114 to move in an axial downward direction. The inlet seat disc 156, being a part of the inlet valve 148, forces the inlet valve 148 in an axial downward direction. The inlet valve spring 160 is thereby compressed, causing a counteracting force to the liquid pressure force. The liquid pressure force, being greater than the inlet spring force, overcomes the inlet valve spring 160, causing the inlet seat disc 156 to separate from the bonnet seat disc 114. The liquid then passes between the inlet seat disc 156 and the bonnet seat disc 114 into the large counter bore 72 of the body seat 60. The liquid then enters the centrally-located through bore 70 of the body seat 60. Liquid pressure from the fluid flow pushes the outlet seat disc 186, which is attached to the outlet valve 170, in a downward direction. This downward motion is counteracted by the resulting compression of the outlet valve spring 190. The liquid pressure force being greater than the outlet spring force causes flow to occur in the gap between the valve seat 78 and the outlet seat disc 186. The liquid then flows through the openings between the hub 136 and the legs 126 of the piston 122.

In this mode of operation, liquid from the sill cock 46 or other inlet line is confined to the passage within the spool 58. However, any residual contaminated liquid that may have accumulated in the passages between the spool 58 and the housing 12 is vented through the drain holes 32.

This exemplary embodiment of a back flow preventer 10 permits the drainage of the sill cock 46 and the internal portion of the back flow preventer 10 when the garden hose 39 is not attached. It also permits for a thorough and complete flushing of the contamination that might have accumulated within the back flow preventer 10 both in the cavities between the spool 58 and the housing 12 and those internal to the spool 58, and further provides for the automatic closing of the valves 148 and 170 upon the installation of the garden hose 39 or other outlet line. When the garden hose 39 is attached to the back flow preventer 10, back flow from the garden hose 39 is prohibited by the outlet valve 170. It will also be understood that should the outlet valve 170 not be thoroughly sealed because of a particulate material or other contamination between the outlet valve seat disc 186 and the valve seat 78, the contamination vents to atmosphere through the axial passages 92 and the drain holes 32. The contamination is not permitted to enter the sill cock 46 because the inlet valve 148 seals the vented internal portion of the back flow preventer 10 from the sill cock 46.

Still other aspects, objects, and advantages of the present invention can be obtained from a study of the specification, the drawings, and the appended claims.

We claim:

1. A back flow preventer for installation between a fluid inlet line and a detachable fluid outlet line, said back flow preventer comprising;
    a housing including means for connecting said back flow preventer to said fluid inlet line at one end of said housing and for connecting said fluid outlet line to the other end of said housing;
    a central cavity within said housing;
    an inlet line drain valve located within said housing between said central cavity and said fluid inlet line to permit drainage of fluid from said fluid inlet line to said fluid outlet line end of said housing when said fluid outlet line is not connected thereto;
    a second valve located within said housing between said central cavity and said fluid inlet line to control flow between said fluid inlet line and said central cavity; and a third valve located within said housing between said central cavity and said fluid outlet line to control flow between said central cavity and said fluid outlet line.

2. The back flow preventer of claim 1 wherein said means for fastening said back flow preventer to said fluid inlet line is an internal threaded connector to mate with a residential sill cock and said means for connecting said back flow preventer to said fluid outlet line is an external threaded connector to mate with an ordinary garden hose.

3. The back flow preventer of claim 1 wherein said three valves have collinear axes.

4. The back flow preventer of claim 1 including means for permanently attaching said backflow preventer to said fluid inlet line.

5. A back flow preventer for installation between a fluid inlet line and a detachable fluid outlet line, said back flow preventer comprising:
- a housing including means for connecting said back flow preventer to said fluid inlet line at one end of said housing and for connecting said fluid outlet line to the other end of said housing and including means for venting internal area of housing to atmosphere;
- a central cavity within said housing;
- a central cavity flow path between said central cavity and said venting means;
- a central cavity drain valve located within said housing between said central cavity and said venting means to control flow through said central cavity flow path, said venting means being sealed from said central cavity by said drain valve only when supply pressure is applied to said drain valve;
- a second valve located within said housing between said central cavity and said fluid inlet line to control flow between said fluid inlet line and said central cavity; and
- a third valve located within said housing between said central cavity and said fluid outlet line to control flow between said central cavity and said fluid outlet line.

6. The back flow preventer of claim 5 wherein said means for fastening said back flow preventer to said fluid inlet line is an internal threaded connector to mate with a residential sill cock and said means for connecting said back flow preventer to said fluid outlet line is an external threaded connector to mate with an ordinary garden hose.

7. The back flow preventer of claim 5 wherein three valves have collinear axes.

8. The back flow preventer of claim 5 including means for permanently attaching said back flow preventer to said fluid inlet line.

9. A back flow preventer for installation between a fluid inlet and a detachable fluid outlet line, said back flow preventer comprising;
- a housing including means for connecting said back flow preventer to said fluid inlet line at one end of said housing and for connecting said fluid outlet line to the other end of said housing and including means for venting internal area of housing to atmosphere;
- a central cavity within said housing;
- a central cavity flow path between said central cavity and said venting means;
- a first valve located within said housing between said central cavity and said fluid inlet line to permit drainage of fluid within said fluid inlet line to control flow between said fluid inlet line and said central cavity;
- a third valve located within said housing between said central cavity and said fluid outlet line to control flow between said central cavity and said fluid outlet line; and
- a fourth valve located within said housing between said central cavity and said venting means to control flow through said central cavity flow path.

10. The back flow preventer of claim 9 wherein said means for fastening said back flow preventer to said fluid inlet line is an internal threaded connector to mate with a residential sill cock and said means for connecting said back flow preventer to said fluid outlet line is an external threaded connector to mate with an ordinary garden hose.

11. The back flow preventer of claim 9 wherein said four valves have collinear axes.

12. The back flow preventer of claim 9 including means for permanently attaching said back flow preventer to said fluid inlet line.

13. A back flow preventer for installation between a fluid inlet line and a garden hose or other outlet line that may or may not be attached to said back flow preventer, said back flow preventer comprising;
- a housing having means for connecting said back flow preventer to aid fluid inlet line at one end of said housing and having means for connecting said back flow preventer to said garden hose or other outlet line at the other end of said housing and including means for venting internal area of housing to atmosphere;
- a central cavity within said housing;
- a spool slidingly fit within said housing to provide a drainage fluid flow path between said spool and said housing and a flow path internal to said spool;
- a central cavity flow path between said central cavity and said venting means;
- an inlet line drain valve, said valve comprising sealing means located between said spool and said fluid inlet line end of said housing for obstructing said drainage fluid flow path when outlet line is connected to said back flow preventer;
- an inlet valve mounted on said spool to control flow between said fluid inlet line and said spool internal flow path;
- a central cavity drain valve, said valve comprising sealing means to control flow through said central cavity flow path; and
- an outlet valve mounted on said spool to control flow between said spool internal flow path and said outlet line.

14. The back flow preventer of claim 13 wherein said housing comprises a body and an adapter.

15. The back flow preventer of claim 13 wherein said body and said adapter are threaded, pressed or bonded together, in any combination.

16. A back flow preventer between an inlet line at an inlet end and an outlet line at an outlet end of said back flow preventer, wherein said outlet line may or may not be attached to said back flow preventer comprising;
- a housing having means for fastening said back flow preventer to said inlet line at one end of said housing and having means for connecting said back flow preventer to said outlet line at the other end of said housing, said housing having an axial bore in said external threaded end, a large central cavity, and a plurality of through holes in a bottom of said central cavity;

a spool having a stem end slidably fit into said bore of said housing with an outside diameter smaller than said central cavity of said housing, said spool being positioned to provide a drainage fluid flow path between said spool and said housing and, also having a spool internal flow path internal to said spool, said drainage flow path being in fluid communication with said through holes in said bottom of said central cavity;

separating means to bias said spool toward a lower position nearer said external threaded end of said housing;

sealing means between a lower bore in said housing and the outer diameter of said stem end of said spool;

a central cavity flow path between said central cavity and said through holes in said housing;

an inlet line drain valve, said valve comprising sealing means between said spool and said inlet end of said housing for obstructing said spool internal flow path when said outlet line is connected to said check valve;

a central cavity drain valve to control flow through said central cavity flow path;

an inlet valve mounted on said spool to control flow between said residential still cock and said spool internal flow path;

an outlet valve mounted on said spool to control flow between said spool internal flow path and said garden hose or other outlet line;

sealing means at a bottom of said internal thread end of said housing;

a piston protruding from said outlet end of said housing, said piston being axially displaced upon connecting said outlet line to said back flow preventer;

means for draining said central cavity when said garden hose or other outlet line is connected and flow comes from said garden hose or other outlet line to said back flow preventer; and a plurality of vertical through holes in said bottom of said central cavity in fluid communication with said drainage flow path.

17. The back flow preventer of claim 16 wherein said outlet valve comprises a pusher post housed in said piston, said pusher post having a first seat disc attached to an outer flange end of said pusher post.

18. The back flow preventer of claim 16 wherein said central cavity drain valve comprises a restraint on the periphery of a disc whereby said disc is permitted to flex outward during flow in said direction of said fluid flow.

19. The back flow preventer of claim 16 wherein said inlet valve comprises a pusher post slidably fitting in an upper bore of said spool.

20. The back flow preventer of claim 16 wherein said sealing means between said lower bore of said housing and the outer diameter of said stem end of said spool comprises an O-ring located in an O-ring groove in the outer diameter of said stem end of said spool.

21. The back flow preventer of claim 16 wherein said separating means to bias said spool toward said lower position comprises a spring located on an upper outer rim of said spool and contacting said housing.

22. The back flow preventer of claim 16 wherein said housing comprises two pieces, the first being a body with external threads on a flange end and attachment means on an opposite smaller end thereof, said second piece being an adapter with means to mate with said flange end of said body.

23. The back flow preventer of claim 16 wherein said spool comprises two pieces, the first being a body seat with said stem end and a flange end having attachment means and said second piece being a bonnet with one end having attachment means to connect with said attachment means of said body seat, said attachment means to include bonding, welding or threading.

24. A back flow preventer for installation between a residential sill cock at an inlet end of said back flow preventer and an outlet line at an outlet end of said back flow preventer wherein said outlet line may or may not be attached to said back flow preventer, said back flow preventer comprising:

a housing comprising two pieces, the first piece being a cylindrical body having a stem end, a flange end, and a through bore, said flange end having large external threads extending from an outer end thereof at least partially along said flange end and having a plurality of axial drain holes located therein, said stem end having a connecting means on said outlet line, the second piece being a cylindrical adapter having a small tubular end, a large tubular end and a central flange to connect the ends, said small end having means for connection to said residential sill cock, said large end having large internal threads extending from an outer end thereof at least partially along said large end to matingly engage large external threads of said flange end of said body, said housing having a large central cavity;

a spool slidingly mated to said through bore of said body, said spool comprising two pieces, the first being a body seat having a stem end and a flange end, said stem end of said body seat having a stem slidably positioned within said through bore of said body, said body seat having a centrally located through bore, said through bore of said body seat having a large counter bore on each end thereof, said flange end of said body seat having a large outside diameter that matingly fits within an inside diameter of said large tubular end of said adapter, said flange end of said body seat having large external threads extending at least partially along a smaller outside diameter thereof and having axial passages therethrough, and the second piece being a cylindrical bonnet having a flange and a large tubular end, said tubular end of said bonnet having internal threads to mate with said large external threads of said body seat, said flange of said bonnet having an end opposite said tubular end with a tapered face having a seal groove therein, said bonnet having an axial bore and an axial passage, said spool being positioned to provide a drainage fluid flow path between said spool and said housing and, also having a spool internal flow path internal to said spool, said drainage fluid flow path being in fluid communication with said drain holes in said housing;

a piston that slidingly fits within said large counter bore on said stem end of said spool, said piston having a stem end and a flange end, said stem end of said piston matingly fitting within said large counter bore in said stem end of said body seat, said flange end of said piston shouldering against said stem end of said body seat, said piston having a centrally located through bore and axial passages, said piston being axially displaced when said garden hose is connected to said check valve;

separating means to bias said spool toward a lower position;

sealing means between a lower bore of said body and an outer diameter of said stem of said spool;

a central cavity flow path between said central cavity and said drain holes in said housing;

an inlet line drain valve, said valve comprising sealing means located between said spool and said inlet end of said housing for obstructing said drainage fluid flow path when said garden hose is connected to said back flow preventer;

an inlet valve mounted on said spool to control flow between said residential sill sock and said spool internal flow path, said inlet valve comprising an inlet pusher post slidably fitting in a bore of said bonnet, said pusher post having a stem, a head on one end of said stem and a stop on the other end of said stem, said pusher post having a first seat disc attached to an inner face of said head of said pusher post;

a central cavity drain valve comprised of a seat disc retained on its outer edge, flexibly deformed by pressure to seal said central cavity from said drain holes in said housing;

an outlet valve mounted on said spool to control flow between said spool internal flow path and said garden hose, said outlet valve comprising an outlet pusher post slidably fitting in a bore of said piston, said pusher post having a stem, a head on one end of said stem and a stop on the end of said stem, said pusher post having a second seat disc attached to an outer face of said head of said pusher post;

sealing means at a bottom of said internal thread end of said body;

a third seat disc located between said inner face of said head of said inlet pusher post and said inner face of said flange end of said bonnet and being restrained on said stem of said disc and permitted to flex outward during flow in a direction of fluid flow.

25. The back flow preventer of claim 24 wherein said sealing means between said axial bore of said housing and said outer diameter of said stem of said spool consists of an O-ring located in an O-ring groove in said stem of said spool.

26. The back flow preventer of claim 24 wherein said sealing means between said spool and inlet end of said housing comprises an O-ring located in an O-ring groove on an upper hub of said spool which mates with a seal area on a rim of said housing.

27. The back flow preventer of claim 24 wherein said separating means to bias said spool toward a lower position comprises a spring located on an upper outer rim of said spool and contacting said housing.

28. The back flow preventer of claim 24 wherein said sealing means at said bottom of said internal threaded end of said housing back flow preventer comprises an O-ring located therein.

* * * * *